United States Patent [19] [11] 3,973,759
Mizrahi et al. [45] Aug. 10, 1976

[54] LIQUID-LIQUID MIXER

[75] Inventors: Joseph Mizrahi; Eli Barnea, both of Haifa, Israel

[73] Assignee: IMI(TAMI) Institute for Research and Development, Haifa, Israel

[22] Filed: Nov. 21, 1974

[21] Appl. No.: 525,741

[30] Foreign Application Priority Data
Nov. 26, 1973 Israel.................................... 43692
June 17, 1974 Israel.................................... 45046

[52] U.S. Cl.................................. 259/8; 259/96
[51] Int. Cl.² ........................................ B01F 7/20
[58] Field of Search............ 259/7, 8, 64, 107, 108, 259/96, 6, 21–23, 41–44, 103

[56] References Cited
UNITED STATES PATENTS
1,982,002  11/1934  Hatch ............................... 259/96
3,202,281  8/1965  Weston .............................. 259/8 X
3,233,876  2/1966  Faure ................................ 259/96
3,752,653  8/1973  Weber .............................. 259/95 X
3,820,759  6/1974  Hege ................................ 259/8 X
3,864,438  2/1975  Nagahama ...................... 259/96 X Primary Examiner—Edward L. Roberts
Attorney, Agent, or Firm—Kirschstein, Kirschstein, Ottinger & Frank

[57] ABSTRACT

A liquid-liquid mixer wherein each impeller is associated with one recirculation chamber or two such chambers, having substantially the same diameter as the impeller. Each such recirculation chamber has the effect of increasing significantly the number of dispersion-recoalescence cycles for a given residence time and in consequence it is possible to employ an impeller of a selectively large diameter — 50–90% of the diameter of the vessel portion in which it is located — and to operate at relatively low speeds of revolution.

20 Claims, 8 Drawing Figures

LIQUID-LIQUID MIXER

The present invention relates to a liquid-liquid mixer for the continuous and efficient mixing of two or more immiscible liquid phases.

Liquid-liquid mixers are widely used in industry where a heat or mass transfer between immiscible liquids is required, e.g., for extractions, chemical reactions, emulsifications and the like. The function of such continuous mixers is to bring the exit liquid phases as close as possible to physico-chemical equilibrium, and the efficiency of such mixers is expressed by the achievement of such result with the minimum residence time in the mixer and the minimum energy input.

In every mixer, there exists in the vicinity of the impeller a so-called "shearing zone" in which liquid drops are broken up into smaller ones. In the other regions of the mixer, the highly dispersed liquid drops recoalesce in part and by a combination of forces resulting from differences in centrifugal pressure there occurs a so-called "free" or "natural" inner circulation by which the dispersion is caused to pass several times through the shearing zone, in which zone there prevail the best conditions for heat and/or mass transfer. By this free inner circulation there are induced several so-called dispersion-recoalescence cycles, and it is generally accepted that the larger the number of such cycles the more efficient the mixing.

In known mixers the dimensions of the mixing impellers are as a rule small, in relation to the vessel dimensions, which is necessary in order to leave sufficient space for the free inner circulation currents, so as to provide for several dispersion-recoalescence cycles. In such mixers, the volume of the shearing zone is only a small fraction of the total mixer volume which in view of the fact that the shearing zone provides the major contribution for the heat and/or mass transfer, is an obvious source of inefficiency. Moreover, the amount of free inner circulation cannot be independently controlled and the only way to increase the rate of recirculation is to increase the impeller's rotational speed. This, however, causes also an increase of the shear forces, which generally leads to the production of smaller droplets of dispersed phase, which have generally a slower rate of coalescence. The slowing of the rate of coalescence in turn has an adverse effect on the efficiency of the mixer, which efficiency, as explained, depends on the well balanced dispersion-recoalescence cycles. Moreover, where the mixer forms part of a mixer-settler unit, the smaller the dispersed droplets produced in the mixer, the slower the rate of separation in the settler. In addition, increase in the impeller rotation speed causes an axial vortex by which air is sucked in and dispersed into the suspension. This may be detrimental.

It has been often attempted to increase the rate of recirculation in a mixer by providing vertical baffles designed to break the rotational motion and consequently, eliminate the air vortex, thus enabling the increasing of the rotational speed of the impeller. However, it has been found that the contribution of such baffles to the heat and/or mass transfer between the liquid phases is insignificant while at the same time the baffles cause a considerable dissipation of kinetic energy with the result that the energetic requirements of such mixers are substantially increased without a commensurate increase of efficiency.

It follows from the above that known mixers with only free internal circulation are inefficient from the point of view of space requirements and volumetric efficiency, whereas those known mixers in which the internal circulation is enhanced by increasing the rotational speed of the impeller, while breaking the air vortex by means of vertical baffles, are inefficient from the point of view of increased energetic requirements.

It is thus an object of the present invention to provide a liquid-liquid mixer free of any of the disadvantages of known mixers and having a high degree of efficiency.

A further object of the invention concerns mixers designed for mixer-settler units. In mixers designed for this purpose the liquid-liquid dispersion resulting from the mixing operation is continuously pumped to a level higher than the hydrostatic head of the heaviest liquid phase, for discharge into the adjacent settler. In a known type of mixers designed for incorporation in a mixer-settler unit, one and the same impeller serves both for mixing and pumping, and this type will be referred to hereinafter as the "pump-mixing type." In pump-mixing type impellers the pumping and mixing functions are coupled. This means, for example, that where the mixer constitutes a relatively high vessel and the discharge therefrom is from the upper region, as is usually the case, the impeller has to rotate at a high speed in order to provide the required lift. The requirement for a relatively high lift is inherent in conventional mixers since, as already mentioned, they have to be large in order to provide for the desired free internal circulation. However, as mentioned above, an increase of the rotational speed of the impeller is accompanied by an increase of the shear forces which in turn reduces the rate of coalescence and thus slows down the separation of the phases in the settler.

It is thus a further object of the present invention to provide a liquid-liquid mixer of the pump-mixing type designed for incorporation in a mixer-settler unit, wherein the required lift is achieved without the creation of excessive shear forces in the shearing zone.

In accordance with the invention there is provided a liquid-liquid mixer comprising a cylindrical vessel with a vertical axis and at least one impeller within the vessel keyed on a coaxial vertical shaft connected to external driving means, and at least one coaxial cylindrical recirculation chamber of essentially the same diameter associated with each impeller in spaced relationship thereto such that mixed liquid phase arriving from the shearing zone and flowing away from the periphery of the mixer is conducted into the recirculation chamber and from there back into the shearing zone.

Where the mixer according to the invention comprises only one single recirculation chamber, this chamber may be located above or below the impeller.

The impeller is preferably of the type known in the art as radial flow or radial thrust type.

In one embodiment of the invention, the mixer has two recirculation chambers, one above and the other below the impeller, preferably at equal distances therefrom.

The mixer according to the invention may be designed for batchwise or continuous operation. In the latter case means are provided for the continuous feeding of the liquid phases into the mixer and for the continuous discharge of the mixed phases therefrom.

It is preferred that the diameter of the impeller be large relative to that of the vessel, say, within the range of 50–90% of that of the vessel portion in which it is located. In this way effective mixing is achieved with relatively low rotational speed.

In one embodiment of the mixer according to the invention designed for continuous operation, there is provided an inlet chamber with means for the separate introduction of the phases to be mixed, and means for conducting the phases to the vicinity of the impeller.

Due to the provision of the recirculation chamber(s) in a mixer according to the invention, the free internal circulation is superimposed by a substantially co-directional forced circulation caused by the transformation of centrifugal energy into kinetic energy of the liquids, and in this way the number of dispersion-recoalescence cycles for a given residence time is significantly increased, e.g., by a factor of 50 or even more, without an appreciable increase of the energetic requirements.

In accordance with one embodiment of the invention each recirculation chamber comprises two spaced circular plates of which the one closest to the associated impeller has substantially the same diameter and comprises a central hole, which plates are interconnected by a plurality of radially oriented partitions.

In the above embodiment the plate farthest away from the impeller may be a terminal wall of the vessel and thus be of larger diameter than the other plate and the impeller. Alternatively both plates may be of the same diameter.

Still in connection with the above embodiment it is preferred that said radially oriented partitions of the recirculation chamber(s) are curved in such a way as to gradually change the tangential flow of the liquid in the peripheral region of the mixer into radial flow.

In accordance with another embodiment of the invention there is provided a liquid-liquid mixer comprising a single impeller located in the bottom region of the vessel and having a bottom plate with a plurality of upright blades connected thereto, the impeller being accessible to liquid flow from above, a single recirculation chamber provided above the impeller having substantially the same diameter and mounted around a tubular vertical passageway for the freshly fed-in phases, an annular horizontal partition for separating between the peripheral region of the impeller and recirculation chamber, means located above the recirculation chamber for the continuous feeding of the liquid phases to be mixed into said tubular passageway, and means for the continuous withdrawal of the mixed phases from the impeller region, the recirculation chamber being designed for a downward discharge of the recirculating liquid.

In accordance with this embodiment the feed-in zone is located above the impeller while the withdrawal of the mixed phases is from the bottom region. Due to the fact that the liquids are fed in from above, a liquid body forms above the impeller which prevents any air suction by the impeller. Air suction by the impeller is a well known nuisance in liquid-liquid mixers which has to be avoided. Normally, this is done by intricate sealing arrangements which are obviated by the present modification.

The last mentioned embodiment is in particular suitable for the incorporation into a mixer-settler unit where a dispersion is to be produced in which a heavy phase present in a relative small proportion is to be the continuous one.

In the last mentioned embodiment the recirculation chamber is mounted around a tubular passageway for the freshly fed-in phases. Consequently, the downflow of the recirculating liquid from the recirculation chamber to the impeller occurs more towards the periphery. Preferably, the recirculation chamber comprises an upper plate with depending, curved partitions. In the recirculation chamber the liquid is directed towards the outer wall of said tubular passageway and in this way the recirculating liquid is diverted downwards.

Due to the fact that in this embodiment the recirculation chamber surrounds the tubular passageway for the freshly fed phases, there occur during operation two parallel flows descending into the impeller region, one of the new feed arriving through said tubular passageway and the other of the recirculating mixed phases arriving from the recirculation chamber.

Preferably, the impeller blades in the last mentioned embodiment are curved and the inner vertical edges are clear of the impeller shaft so as to leave within the impeller a free space adapted to receive the parallel downward streams of the freshly fed and recirculating phases. From this space the liquids are then driven to the periphery of the impeller and ejected therefrom into the surrounding space of the mixer vessel.

Where the mixer according to the last mentioned embodiment is designed for forming part of a mixer-settler unit there may be provided means for the recirculation of either of the two phases from the settler back into the mixer.

Due to the provision of the recirculation chamber(s) in a mixer according to the invention, the height of the mixer may be reduced as compared to conventional mixers. This reduction, apart from being desirable per se, is of particular advantage in mixers of the pump-mixing type since it means that the lift required for the discharge is reduced, which in turn means that the impeller may perform its pumping function with a relatively low rotational speed.

It is thus seen that in a mixer according to the invention the rotational speed is small as compared to conventional mixers due to the combination of a large diameter impeller with a comparatively small height of the vessel and in this way undue dispersion of the liquid phases into too small droplets is avoided.

If desired, the recirculation chambers or at least one recirculation chamber where two or more chambers are associated with each impeller, is or are fitted with adjustable shutters designed for the control of the rate of recirculation. Thus, where the shutters are fully open the proportion of the recirculated liquid is at its maximum, and by gradually closing the shutters this proportion is gradually reduced.

The invention also provides a mixer-settler unit embodying a mixer as hereinbefore defined.

In the following, the invention will be further explained with reference to mixers designed for mixer-settler units, it being understood that this is merely an illustration and that the invention is not confined to such mixers.

The assembly of the impeller and one recirculation chamber or two recirculation chambers, as the case may be, will be referred to hereinafter as "mixing unit." Because of the fact that the diameter of the various components of the mixing unit are smaller than that of the vessel, an annular space is left between the mixing unit and the vessel wall. This annular space constitutes an annular "flow reversal and recoalescence" zone. The phases to be mixed are fed directly to the centre of the shearing zone of the impeller in the manner specified. The dispersion, formed as a result of the shear forces caused by the rotation of the impeller, is forced into the flow reversal and recoalescence zone, in which part of the droplets of the dispersed phase coalesce as a result of mutual collisions. A small part of the dispersion is discharged to a phase separator (settler) through an outlet, while the major part of the dispersion is directed by pressure difference forces into the recirculation chamber(s), to be returned from there into the shearing zone of the impeller. Significant coalescence is also obtained in the recirculation chamber(s) where the flow conditions are less shearing. By this induced recirculation, the number of passes through the shearing zone for a given residence time is increased by a factor of up to 50 or even more, as compared to conventional pump-mixing type mixers.

In one embodiment of the invention the vertical distance from the horizontal central plane of the impeller to the adjacent horizontal plate(s) of the recirculation chamber(s) is up to three times the vertical height of the impeller.

According to another feature of the invention, the mixer may comprise a plurality of superimposed coaxial mixing units connected in series with all the impellers being keyed on the same shaft, each mixing unit being separated from the one above it by a horizontal partition having a central opening. Preferably, the mixing units have all the same diameter so as to leave a uniform annular space between them and the wall of the vessel. Such an arrangement produces a more favourable residence time distribution. In addition, it enables a desired elevation in hydrostatic head to be obtained with a lower rotational speed, and therefore enables an easier phase separation to be achieved. Further, this arrangement enables the desired residence time distribution of the liquid streams and elevation to be obtained with smaller diameters of impellers and vessel, whenever this may be necessary or desirable because of constructional or layout considerations.

In one embodiment of the invention, the mixer comprises an inner coaxial cylindrical partition supported on the upper plate of the uppermost recirculation chamber. This partition forms together with the mixing unit or units a continuous annular space for the lift of the mixer liquid to the outlet. This annular space may be utilized for achieving a precoalescence thereby to reduce the residence time in the settler. Such precoalescence may be enhanced by providing coalescence inducing means inside the annular space, above the uppermost recirculation chamber.

Further features and advantages of the invention will be apparent from the description below.

The invention is herein described, by way of example only, with reference to the accompanying drawings, wherein.

Figure 1:
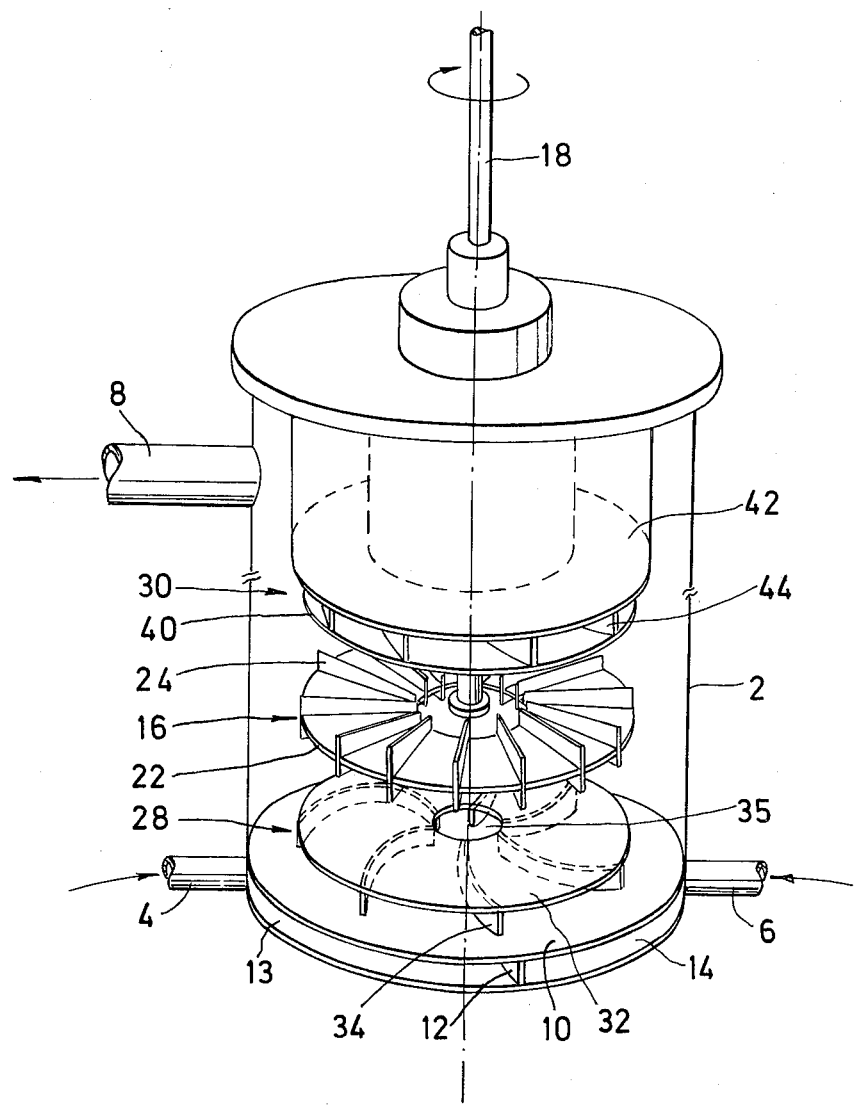
FIG. 1 is a perspective view illustrating one form of a pump-mixing type liquid-liquid mixer constructed in accordance with the present invention.
Figure 2:
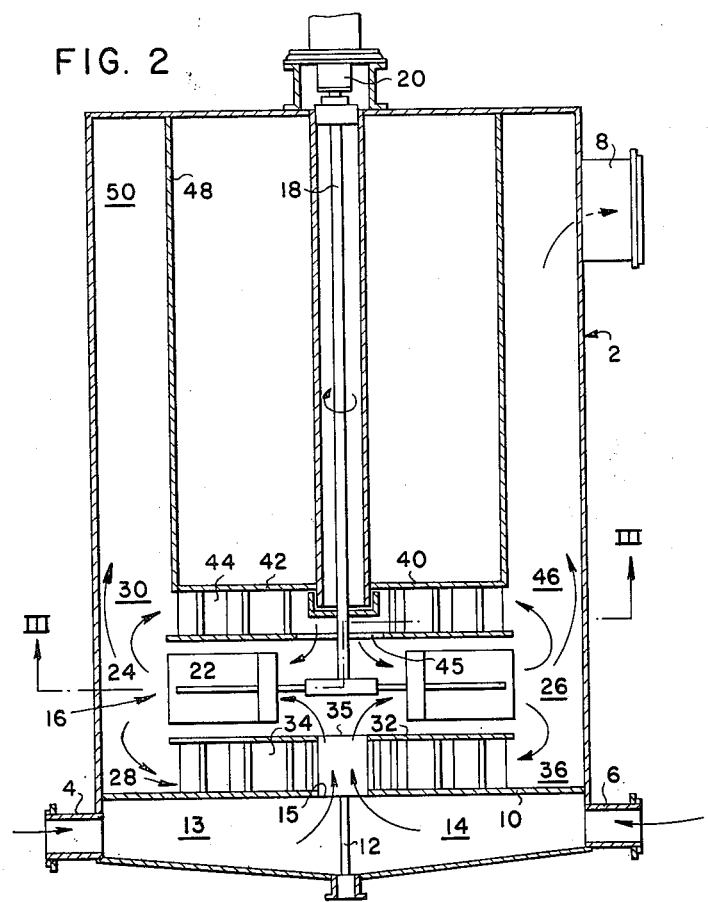
FIG. 2 is a longitudinal sectional view of the mixer of FIG. 1.
Figure 3:
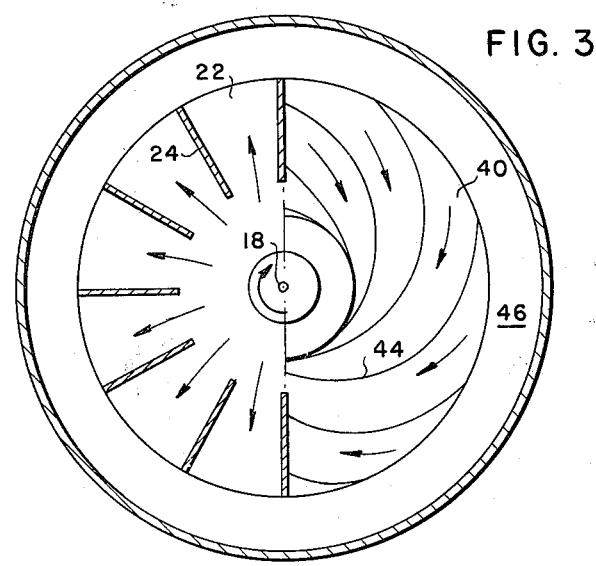
FIG. 3 is a transverse sectional view along lines III—III of FIG. 2.

The liquid-liquid mixer illustrated in FIGS. 1-3 of the drawings if of the pump-mixing type as described above and comprises a single mixing unit. It includes a cylindrical vertical vessel 2 having two inlets 4, 6 for the liquids to be mixed, and an outlet 8. A horizontal partition 10 and a vertical partition 12 define the two inlet chambers 13, 14, respectively, horizontal partition 10 being formed with a central opening 15 directing the liquids from the two inlet chambers into the interior of the vessel.

A pump-mixing impeller 16 is disposed within the vessel and is keyed to a centrally located vertical shaft 18 connected to external driving means, schematically shown at 20 (FIG. 2), which may be an electrical drive motor or a mechanical coupling connected to a drive. Impeller 16 comprises a disc 22 and a plurality of radial blades 24 fixed to both faces of the disc. Both the disc and blades are of smaller diameter than that of vessel 2, to provide an annular space 26 between the impeller and the vessel wall.

A cylindrical recirculation chamber, generally designated 28, is provided below impeller 16, and a second cylindrical recirculation chamber 30 is provided above the impeller.

The lower recirculation chamber 28 is defined by a plate 32 fixed to horizontal partition plate 10 by means of a plurality of radially oriented partitions 34. Plate 32 is formed with a central opening 35 coaxial with opening 13 of plate 10 to provide a path for the fluid from inlet chambers 13 and 14 to the impeller 16. In addition, plate 32 is of smaller diameter than the diameter of vessel 2, being substantially equal to the diameter of impeller 16 to provide an annular space 36 concentric with space 26 around the impeller 16.

The upper recirculation chamber 30 is of the same construction as the lower one 28, including a pair of fixed plates 40, 42 interconnected by a plurality of radially oriented partitions 44. The lower plate 40 is formed with a central opening 45 for directing the liquids therefrom to the vicinity of impeller 16. Both plates 40 and 42 of the upper recirculation chamber 30 are of substantially the same diameter as impeller 16 and plate 32 of the lower recirculation chamber, to provide an annular space 46 concentric with annular spaces 26 and 36 described above.

The specific configuration of the radially-oriented partitions 34, 44 in the two recirculation chambers 28, 30 can best be seen in FIG. 3, this figure illustrating only the partitions 44 of the upper recirculation chamber. As shown, these partitions 44 are curved in the direction of rotation of the impeller 16, their outer portions approaching the tangents to their respective plates to provide a smooth flow of the liquid in the direction from the outer periphery of the chamber towards the center thereof.

The upper plate 42 of the upper recirculation chamber 30 supports a cylindrical partition 48 extending upwardly coaxially to shaft 18 to the top of the vessel. The diameter of cylindrical partition 48 is substantially the same as that of the recirculation chambers 28, 30 and impeller 16, so that the annular space 50 between partition 48 and the vessel wall defines an annular channel from annular spaces 26, 36, 46 to outlet 8.

The foregoing mixer construction produces four distinct zones, as follows: a shearing zone in the immediate vicinity of impeller 16; two recirculation zones defined by the two recirculation chambers 38, 30; and a flow-reversal-and recoalescence zone defined by annular spaces 26, 36 and 46.

The liquids introduced through their respective inlets 4, 6 pass from their respective inlet chambers 13, 14 into the vicinity of impeller 16 (the shearing zone) via openings 15, 35 in the plates of the lower recirculation chamber 28. The liquid drops are broken up by impeller 16 into smaller ones in this shearing zone, and are forced into the flow-reversal-and-recoalescence zone (annular spaces 26, 36, 46). A part of the dispersion (usually the major part) is recirculated back to the vicinity of impeller 16 via recirculation chambers 28, 30 and their respective central openings 35, 45. Another part of the dispersion is elevated in annular chamber 50 (its kinetic and centrifugal energy being converted into potential energy) and is discharged through outlet 8, the latter outlet preferably being made tangential to the cylindrical vessel 2, in the direction of the rotation of the liquids, to minimize the frictional head 1 losses.

The apparatus described above was found to provide very efficient mixing for the following reasons: First, there is a better utilization of the mixer's volume as a result of the extension of the shear zone in the vicinity of the impeller. Also, the exit phases were found to reach a desired approach to equilibrium, with respect to mass and/or heat transfer, within a shorter mean residence time than would be required with existing types of industrial equipment, thus resulting in savings in equipment size and liquid inventory. In addition, the described device provides efficient and independently controlled forced internal recirculation, which enhances the rate of mass and/or heat transfer by increasing the intensity of the dispersion-recoalescence mechanism.

Further, the pumping action is achieved as an inherent consequence of the mixing action, which thereby obviates the need of additional energy or an additional pump to elevate the dispersion.

Still further, the apparatus was found to produce better separation characteristics of the produced dispersion, thus requiring smaller settling areas, since the dispersion discharged from the recoalescence zone in which the mean drop size is larger than that produced in the impeller or shear zone. Moreover, in case of a phase system which is sensitive to shearing intensity, mixing at relatively low intensities is possible while retaining efficient mass and/or heat transfer because of the efficient internal, forced recirculation. Also, the dispersion produced has a high degree of homogeneity, and there is less of a tendency for spontaneous phase inversion to occur.

Preferably, the diameter of the impeller 16 is about 50-90% of the diameter of the vessel 2. Also, the height of each recirculation chamber 28, 30 may be equal to 5-40% of the total height of the vessel.

As one example, the vessel diameter may be 127 cm, the impeller diameter may be 102 cm, and there may be 24 impeller blades each of a height of 17 cm and a length of 31 cm. The height of each recirculation chamber 28, 30 may be about 7 cm.

Figure 4:
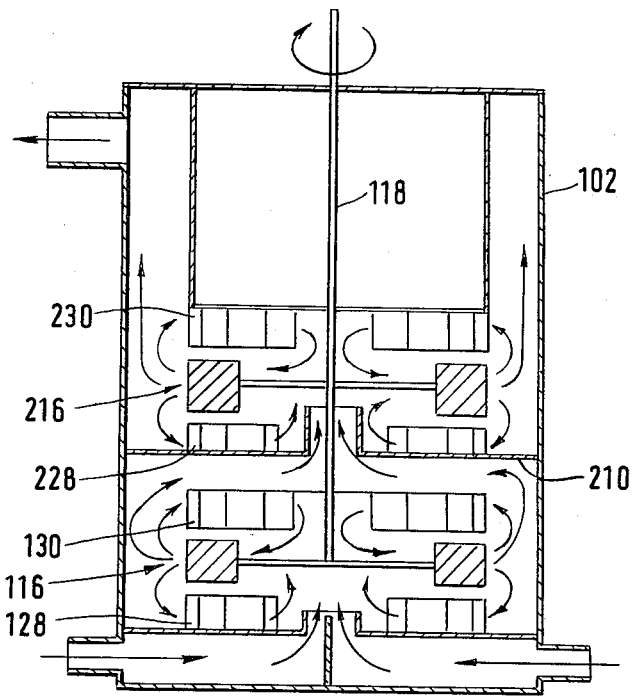
FIG. 4 illustrates a variation in the mixer of FIGS. 1-3.

FIG. 4 illustrates a variation in which the mixer is provided with two serially connected mixing units. As shown, the vertical cylindrical chamber 102 includes two impellers 116, 216 vertically spaced above each other and keyed to the same vertical drive shaft 118 for rotation in unison. In addition, a recirculation chamber is provided above and below each of the impellers, there being recirculation chambers 128, 130 on the two sides of impeller 116, and recirculation chambers 228, 230 on the two sides of impeller 216. The lower mixing unit is separated from the higher one by a horizontal partition 210 having a central opening to permit the fluids to flow in serial fashion from the lower unit to the higher one. As mentioned earlier, this arrangement enables obtaining the desired elevation in hydrostatic head with a lower rotational speed, provides a more favourable residence time distribution, and enables achieving the desired residence time and elevation with smaller diameters of impellers and vessels.

The rate of recirculation is effected by the rotational speed of the impeller and the geometry of the apparatus. The ratio of the throughput of recirculated liquid to the feed throughput may be in the range 5-100. To enable independent control of the rate of recirculation, the openings connecting the recirculation chambers (28, 30) with the flow-reversal-and-recoalescence zones (spaces 26, 36, 46) may be partially obstructed by means of mechanically operated shutters.

Figure 5:
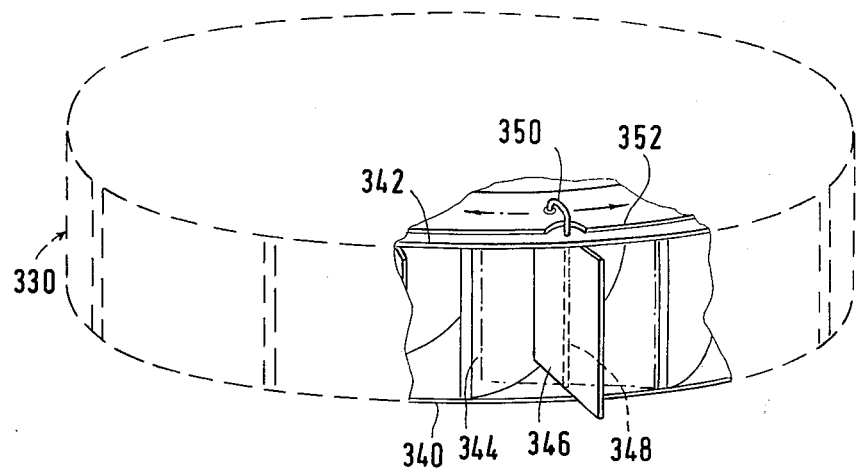
FIG. 5 illustrates a further variation.

FIG. 5 illustrates such an arrangement for the recirculation chambers. As shown in FIG. 5, the recirculation chamber 330 is constructed the same as the previously described ones (28, 30 in FIGS. 1-3), including the two fixed plates 340, 342 interconnected by radially oriented partitions 344, except the entrance to each partition of the recirculation chamber carries a shutter 346 fixed to a pivotally mounted vertical axle 348 and moved by any suitable mechanism to open or close the shutters in unison. The mechanism illustrated in FIG. 5 for purposes of example includes a crank 350 fixed to the end of each axle 348 and moved by a common ring 352. In this manner, the proportion of the liquid recirculated back to the impeller, as compared to the proportion elevated through channel 50 and discharged through outlet 8 (FIGS. 1, 2) can be varied according to the position of the adjustable shutters. Thus, the number of passes of the liquid through the shearing zone can be conveniently adjusted without changing the speed of rotation of the impeller.

Figure 6:
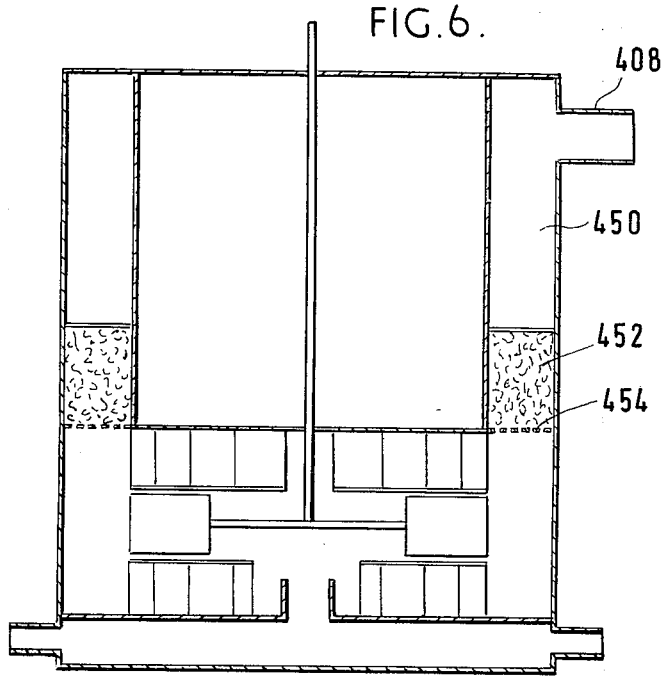
FIG. 6 illustrates a still further variation.

FIG. 6 illustrates a still further variation, wherein the annular channel 450 (corresponding to channel 50, FIG. 2) leading to the outlet 408 is provided with coalescence-inducing means in the form of a bed of granular or fibrous packing material to produce a partial separation of the dispersion and an increase in the mean diameter of the drops in the dispersion. This packing material is supported on a porous or apertured grid 454. Instead of packing material, channel 450 could include helicoidal baffles as the coalescence-inducing means.

Many other variations, modifications and applications of the illustrated embodiments will be apparent.

Figure 7:
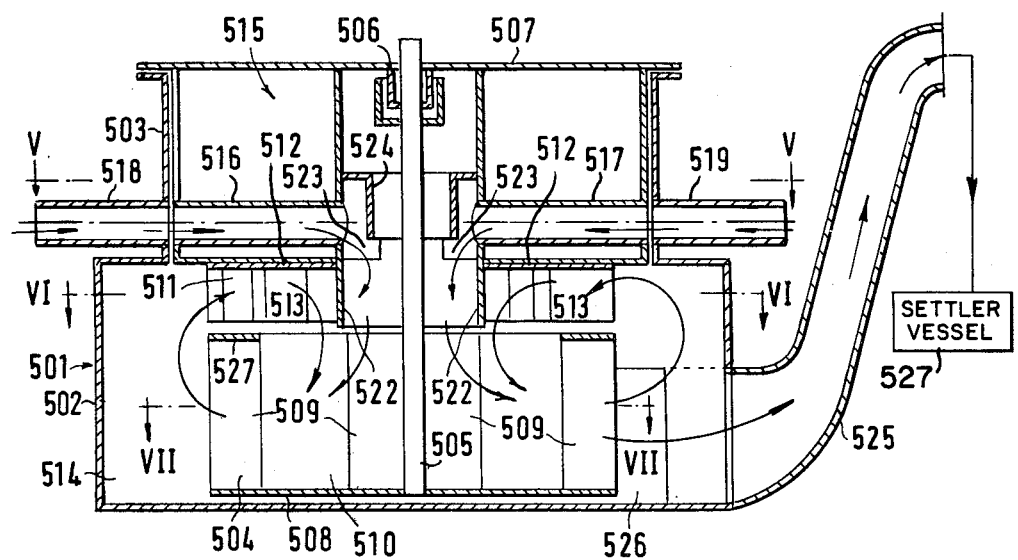
FIG. 7 is a vertical section through another embodiment.
Figure 8:
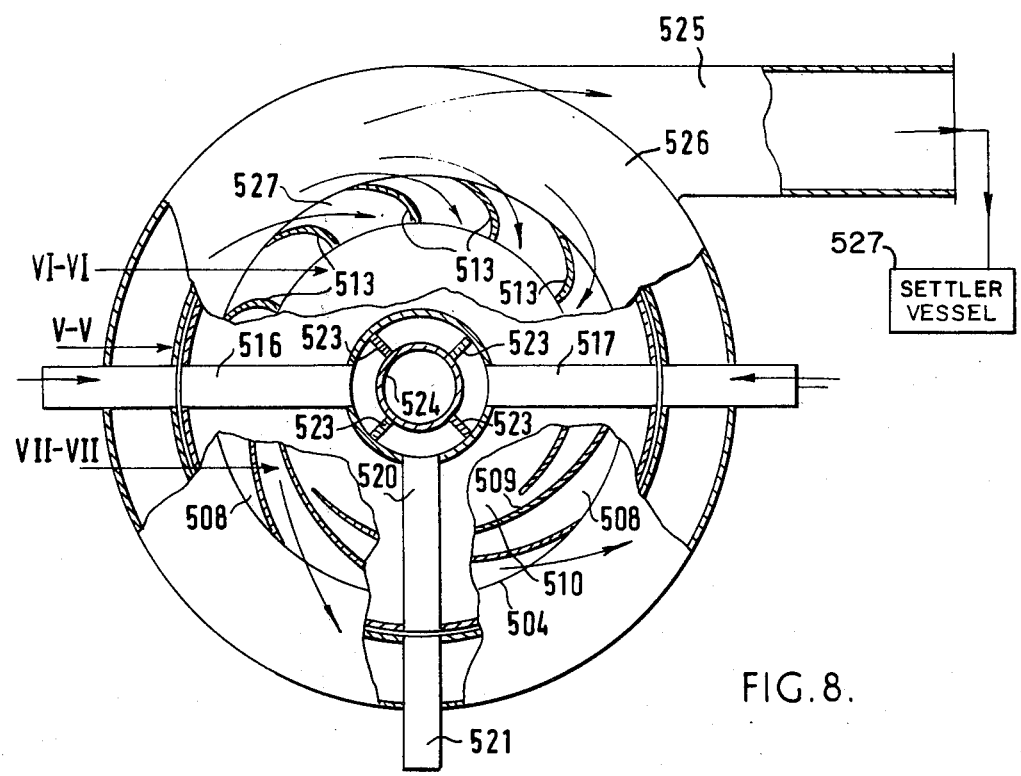
FIG. 8 is a plan view with fragmentary cross sections along lines V—V, VI—VI and VII—VII of FIG. 7.

The liquid-liquid mixer illustrated in FIGS. 7 and 8 comprises a vessel 501 having a lower portion 502 of larger diameter and an upper portion 503 of reduced diameter. Within the portion 502 of vessel 501 is mounted an impeller 504 keyed on a shaft 505 which passes through a liquid seal 506 depending from a cover 507 and is connected to external driving means (not shown).

The impeller 504 comprises a base plate 508 integral with a plurality of upright, curved blades 509 whose inner vertical edges are located at a distance from shaft 505 and define between them a space 510 adapted to receive both the freshly fed and recirculating liquids arriving from above in parallel flows.

An annular horizontal partition 527 is mounted on top of the impeller blades 509 to cover the upper peripheral portion of the impeller.

Above the impeller 504 is located a recirculation chamber 511 of practically the same diameter, which comprises an upper plate 512 from which depend a plurality of curved partitions 513.

The impeller 504 and recirculation chamber 511 are surrounded by an annular space 514.

The recirculation chamber 511 forms part of an insert 515 which comprises horizontal tubular passages 516 and 517 registering in the mounted position with, respectively feed tubes 518 and 519 for the freshly fed phases, and a further tubular passage 520 registering in the mounted position with a tube 521 for the recirculation of either of the phases from an associated settler vessel. The insert further comprises a sleeve 522 serving as passageway for the inflow of the freshly fed phases and preventing their premature mixture with the recirculated phases, and a set of vertical partitions 523 and a tubular member 524 which serve for diverting the inflowing phases and any phase recirculated from an associated settler vessel downwards towards the impeller 504.

If desired, the entire insert 515 can be removed which enables free access to the impeller for maintenance purposes.

As is seen from FIG. 7, the feed of the fresh phase and any phase recirculated from the associated settler vessel is from above the impeller.

An ascending pipe 525 is connected to an opening 526 in portion 502 of the vessel and is positioned in radial relationship to the vessel. This pipe 525 serves for the withdrawal of the mixed phases from the annular space 514.

The diameter of the impeller 504 in this embodiment is about 60% of that of portion 502 of the vessel within which it is mounted.

The sets of arrows in FIGS. 7 and 8 clearly show the liquid flow pattern during operation. It is seen that the feed and recirculated phases are diverted downward by the tubular member 524 so as to flow through the sleeve 522 into the inner space 510 of the impeller wherein the flow is converted by the curved blades into a radial flow and the mixed phases are ejected from the impeller into the surrounding annular space 514. The vertical partitions 523 prevent any premature mixing of the fed-in phases and any recirculated phase with each other.

The horizontal, annular, peripheral partition 527 prevents any direct ascent of liquid from the impeller to the recirculation chamber and thus ensures the proper recirculation pattern through annular space 514. The pattern of the recirculation also becomes apparent from the various arrows in FIG. 7 and it is seen that the liquid ejected from the impeller ascends in the tubular space 514, enters the recirculation chamber 511 where it is diverted downward to return into the impeller.

It is estimated that due to the forced recirculation there occur about 50 dispersion-recoalescence cycles before the withdrawal of the mixed phases through the withdrawal pipe 525, which later may lead to an associated settler vessel. The speed of the rotation of the impeller has to be such that the pumping effect is sufficient to overcome the liquid head between the inflow and outflow.

During the entire operation a liquid body exists above the impeller which prevents any air from being sucked in by the impeller. The function of the liquid seal 506 is mainly to prevent any evaporation or splashing of liquid out of the vessel 527.

What is claimed is:

1. A liquid-liquid mixer comprising a cylindrical vessel with a vertical axis and at least one impeller within the vessel keyed on a coaxial vertical shaft connected to external driving means for imparting to the impeller a rotational movement, the diameter of the impeller being from about 50% to about 90% of that of the vessel, and associated with each impeller in spaced relationship thereto at least one coaxial recirculation chamber of a diameter which is essentially the same as that of the impeller and comprising two spaced circular plates of which the one closest to the associated impeller has a diameter substantially the same as the impeller and comprises a central hole, which plates are interconnected by a plurality of partitions extending from within in direction of the periphery, whereby a liquid-liquid dispersion arriving from the shearing zone of an impeller and flowing away from the periphery of the mixer is conducted into an associated recirculation chamber and from there back into the shearing zone.

2. A mixer according to claim 1, wherein each impeller is of the type known as radial flow or radial thrust type.

3. A mixer according to claim 1, wherein the plate farthest away from the impeller is a terminal wall of the vessel and is of a larger diameter than the impeller.

4. A mixer according to claim 1, wherein both plates have the same diameter.

5. A mixer according to claim 1, comprising a single impeller.

6. A mixer according to claim 5, comprising two recirculation chambers of which one is located above and the other below the impeller.

7. A mixer according to claim 6, wherein the recirculation chambers are at equal distances from the impeller.

8. A mixer according to claim 5, wherein the vertical distance from the horizontal central plane of the impeller to an adjacent horizontal plate of a recirculation chamber is up to three times the vertical height of the impeller.

9. A mixer according to claim 5, designed for continuous operation and comprising means for continuously feeding the liquid phases into the mixer and for continuously discharging the mixed phases therefrom.

10. A mixer according to claim 9, comprising an inlet chamber with means for the separate introduction of the phases to be mixed and means for conducting the phases to the vicinity of the impeller.

11. A mixer according to claim 9, wherein the impeller blades are curved and the inner vertical edges are clear of the impeller shaft.

12. A mixer according to claim 5, wherein the recirculation chamber(s) comprise(s) curved partitions extending from within in direction of the periphery.

13. A liquid-liquid mixer comprising a cylindrical vessel with a vertical axis and a single impeller located in the bottom region of the vessel and having a bottom plate with a plurality of upright blades connected thereto, the impeller being accessible to liquid flow from above, a single recirculation chamber provided above the impeller having a diameter substantially the same as that of the impeller and mounted around tubular vertical passageway for the freshly fed-in phases, an annular horizontal partition for separating between the peripheral region of the impeller and recirculation chamber, means located above the recirculation chamber for the continuous feeding of the liquid phases to be mixed into said tubular passageway, and means for the continuous withdrawal of the mixed phases from the impeller region, a coaxial vertical shaft connected to external driving means and keyed to the impeller for imparting to the impeller a rotational movement, the diameter of the impeller being from about 50% to about 90% of that of the vessel.

14. A mixer according to claim 9 comprising means for the recirculation of either of the two phases from an associated settler.

15. A mixer according to claim 1, wherein the recirculation chamber is fitted with adjustable shutters designed for the control of the rate of recirculation.

16. A mixer according to claim 1, wherein the impeller includes a horizontal disc having at least on one face radially oriented blades.

17. A mixer according to claim 1, comprising a plurality of superimposed coaxial mixing units each including an impeller with associated recirculation chambers above and below it, all the impellers being keyed on the same shaft, each mixing unit being separated from the next higher one by a horizontal partition having a central opening.

18. A mixer according to claim 1, comprising discharging means at the top of the vessel, the uppermost recirculation chamber comprises an upper plate supporting an inner, coaxial, cylindrical partition extending to said discharging means, the diameter of said partition being substantially the same as that of the impeller and of the recirculation chambers, said cylindrical partition providing an annular chamber between it and the vessel wall for the lift of the mixed liquids to the discharging means.

19. A mixer according to claim 18, wherein said annular chamber includes coalescence-inducing means.

20. In combination, a mixer in accordance with claim 1, said mixer including a discharge passageway and a settler to which said discharge passageway leads.

* * * * *